Nov. 2, 1943.   H. A. BENZEL   2,333,288
VALVE
Filed July 1, 1942   2 Sheets-Sheet 1
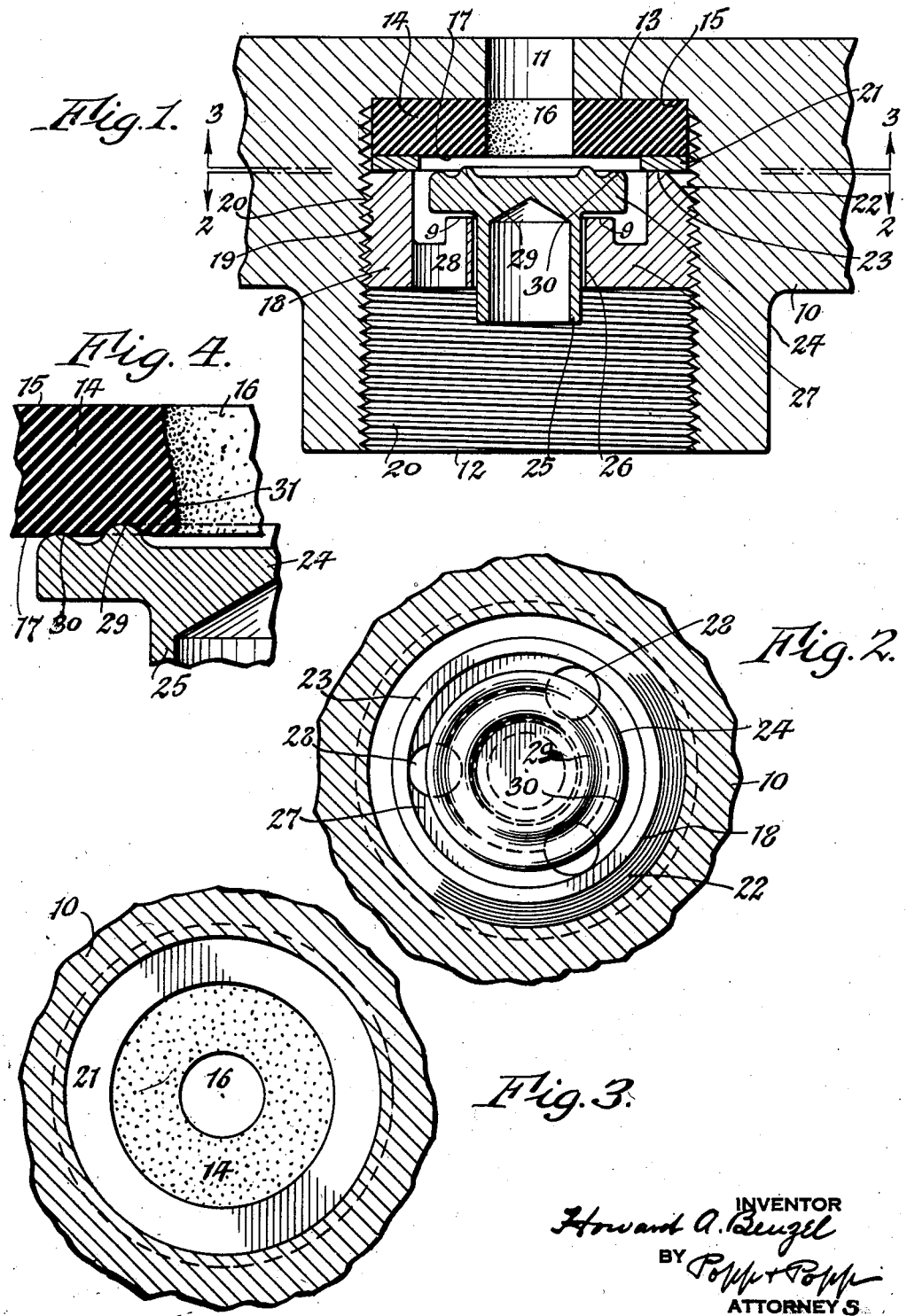
INVENTOR
Howard A. Benzel
BY Popff + Popff
ATTORNEYS

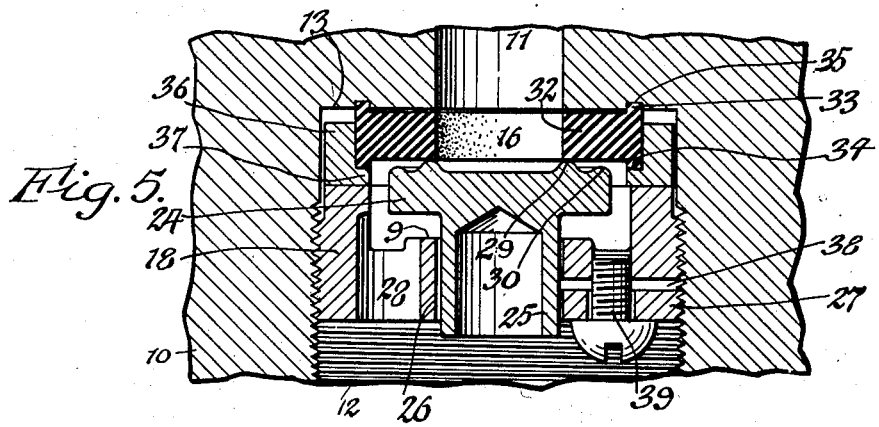
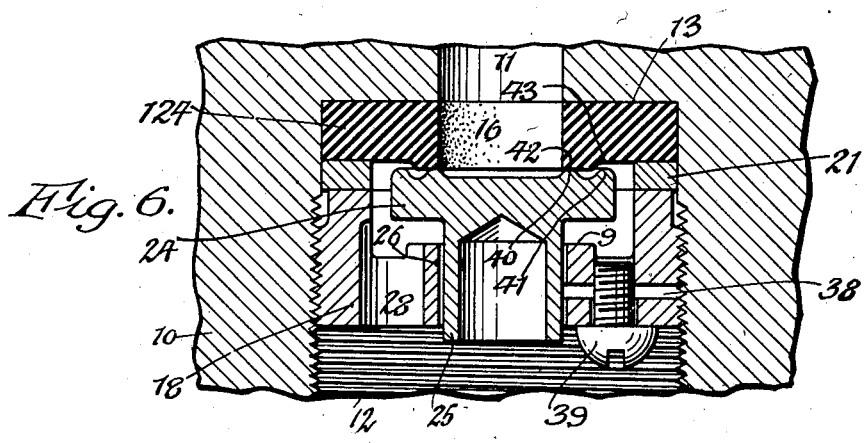
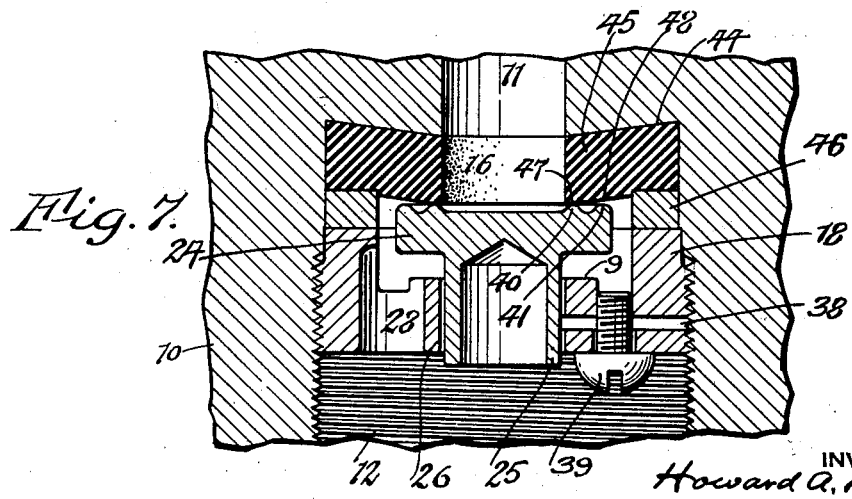

Patented Nov. 2, 1943

2,333,288

UNITED STATES PATENT OFFICE 2,333,288

VALVE

Howard A. Benzel, Marilla, N. Y., assignor to Scott Aviation Corporation, Lancaster, N. Y., a corporation of New York Application July 1, 1942, Serial No. 449,220

2 Claims. (Cl. 251—127)

This invention relates to a valve structure and more particularly to a check valve intended for use in an apparatus whereby oxygen is supplied to the mask of an aviator when flying in high altitudes.

Apparatus for this purpose must be as compact and light as possible and this of necessity requires the check valve structure to be made very small. Owing to the necessity of making these check valves very small it has been very difficult to make the same leak-tight so that the oxygen supplying apparatus will operate most efficiently and reliably.

It is therefore the object of this invention to provide a valve structure which can be made very small and yet operate to positively prevent leakage when the same is in a closed position and thus operate with maximum efficiency in controlling the flow of oxygen or other fluid.

In the accompanying drawings:

Fig. 1 is a longitudinal section of a satisfactory example of check valve structure embodying this invention and showing the valve open.

Figs. 2 and 3 are cross sections of the same taken on the correspondingly numbered lines in Fig. 1 and looking, respectively, in the direction of the arrows associated with these lines.

Fig. 4 is a fragmentary section, on an enlarged scale, similar to Fig. 1, showing the valve closed.

Figs. 5, 6 and 7 represent sectional views similar to Fig. 1, showing various modifications of this invention.

In the following description similar reference characters indicate like parts in the several figures of the drawings.

Referring to Figs. 1–4, the numeral 10 represents the body of a check valve which is organized to open and permit gas, air or other fluid to flow in one direction but prevent flow of the same in the opposite direction as required, for example, in apparatus for supplying oxygen from containers to the gas masks of aviators who are required to reach very high altitudes.

A main fluid passage extends through this body from one side of the same to the other which comprises a comparatively small inlet opening or section 11 and a comparatively large outlet opening or section 12, both of which are of tubular form and axially in line and provide an annular flat shoulder 13 which faces toward the large part of the fluid passage.

The numeral 14 represents a valve ring or annular valve member which is made of soft rubber or other resilient material and provided with a flat rear side 15 which engages with the flat shoulder 13, a central port 16 which registers with the inlet section 11 of the fluid passage and a flat front valve seat 17 which faces toward the large section of the fluid passage in the body.

This valve ring is securely held against the shoulder 15 of the valve body by a clamping and guiding sleeve 18 which is movable toward and from the valve ring and provided with an external screw thread 19 on its periphery which engages with an internal screw thread 20 on the bore of the large part of the fluid passage. By screwing the clamping sleeve inwardly the same exerts pressure against the valve ring for holding the same in place. A washer or bearing ring 21 of metal is preferably interposed between the front or inner end of the clamping sleeve and the valve face of the valve ring so that the pressure of the latter when screwing the same forwardly will be transmitted to the valve ring without causing distortion or displacement of the adjacent part of the valve ring but instead will leave the same flat to provide an even valve seat. The inner or front end of the clamping sleeve is preferably tapered, as shown at 22, thereby forming a narrow bearing face 23 on the respective end of the clamping sleeve which engages with the bearing washer 21 at a distance from its outer edge and concentrating this pressure adjacent to the inner edge of this washer and thus maintaining the valve seat of the valve ring in a flat condition.

The numeral 24 represents a non-resilient valve closure member which is preferably constructed of metal in the form of a disk and mounted on the clamping sleeve so as to be movable toward and from the valve ring. This disk-shaped valve closure is preferably guided on the clamping sleeve by a valve stem 25 projecting outwardly from the central rear part of the valve disk and sliding in a guideway 26 in the central part of a web 27 formed on the outer or rear part of the clamping sleeve. Communication between the interior of the clamping sleeve and the interior of the large part of the fluid passage is established through by-pass openings 28 formed in the web 27 between the guideway 26 and the clamping sleeve.

When fluid is admitted through the small part or end 11 of the fluid passage the pressure against the valve disk 22 moves the same away from the seat on the valve ring, thereby uncovering the port 16 in the valve ring, as shown in Fig. 1, and permitting the fluid to flow through the clamping sleeve, by-pass openings 28, and discharge through the large outlet part or end of the fluid passage to whatever space is in communication with the latter.

Whenever the flow of fluid inwardly through the small inlet end 11 of the fluid passage ceases and the pressure of the fluid in the large outlet end 12 predominates, the valve disk 24 is moved forwardly or inwardly by this pressure so as to engage its front side with the valve seat and cover the port 16, as shown in Fig. 4, thereby closing this check valve and preventing flow of liquid or gas in a reverse direction through the fluid passage. The opening movement of the valve disk is limited by engagement of the rear side thereof with a stop 9 formed on the inner side of the web 27 around the by-pass openings 28 therein.

In the manufacture of oxygen supplying apparatus for aviators it is necessary to make the check valves controlling the supply of this fluid as light as possible and yet insure proper sealing of these valves in their closed positions in order to secure proper functioning of the apparatus and maximum benefit to the user. The drawings in this case show a construction of check valve embodying the present improvement which renders the same particularly suitable for use in oxygen supplying apparatus for aviators. In actual practice this check valve is quite small and the drawings of the same have therefore been enlarged for the purpose of showing the details of construction more clearly.

For the purpose of insuring a leak-tight joint between the relatively movable members of this check valve comprising the resilient member or soft rubber valve ring and the non-resilient member or metal valve disk and insure positive closure of the port of this valve under comparatively light pressure, means are provided in accordance with this invention which are constructed as follows:

The numeral 29 represents an inner annular sealing rib or bead of comparatively small diameter arranged on the front side or face of the valve disk 24, and 30 an outer annular sealing ring or bead of comparatively large diameter arranged on this side of the valve disk around the inner rib or bead. These sealing ribs are preferably made integrally with this disk and arranged concentrically with each other and also concentrically relative to the axes of this disk and the port or valve opening 16 in the valve ring. Each of these sealing ribs is uniformly of half-round or substantially half-round cross section in all parts thereof and the inner rib of small diameter is made comparatively high relative to the front face of the valve disk while the outer rib of large diameter is made comparatively low relative to this face of the valve disk so that the plane of the summit of the inner sealing rib is higher or in advance of the plane of the summit of the outer sealing rib, as shown in Figs. 1 and 4.

When the valve disk is retracted from the valve ring, as shown in Fig. 1, the port 16 is uncovered and the valve ring is in its normal condition in which no parts of the same are distorted and the seat on the front side thereof is flat.

As the valve disk moves toward the valve ring for closing the check valve, the summit of the inner small sealing rib is first to come into engagement with the flat seat of the valve ring immediately adjacent to the port of the valve ring and effects an initial closure of the check valve by cutting off communication between the inlet and outlet ends of the fluid passage of the valve. If thereafter greater pressure is exerted against the rear side of the valve disk the inner sealing rib is embedded moderately in the soft seat of the valve ring and thereby produces an increased or secondary closing effect of the valve. As the pressure on the rear side of the valve disk increases the inner sealing rib is embedded deeper in the seat of the rubber valve ring and the summit of the outer large sealing rib engages with the seat of the valve ring remote from the port and thereby further increasing the closure effect of the valve. Any further increase in pressure on the rear side of the valve disk will cause the outer sealing rib to also embed itself in the soft seat or face of the valve ring and increase the extent to which the inner sealing rib is embedded in the seat of the valve ring and thereby increase the sealing effect of the valve accordingly.

By thus successively engaging the inner small sealing rib and the outer large sealing rib with the seat of the valve ring it is possible to effect the initial sealing effect by a moderate pressure against the rear side of the valve disk because at this time the marginal part of the front side of this disk is exposed to pressure and to that extent offsets the pressure against the rear side of the valve disk but when the large sealing rib also bears against the valve seat the marginal part of the front side of the valve disk is cut off and the full pressing effect is exerted against the rear side of the valve disk, thereby insuring an absolute closure of the valve and preventing objectionable leakage through the same.

It is to be noted that the first sealing effect of the valve is produced due to the inner part of the rubber valve ring around the port being unrestrained and free to be displaced inwardly toward said port, as shown at 31 in Fig. 4, thus promoting the sealing effect of the inner rib while the large outer sealing rib engages the peripheral part of the rubber valve ring which is more resistant or solid because it is clamped between the fastening sleeve 18 and the adjacent bore and shoulder of the valve body, thereby forming a firm surface to be engaged by the large outer sealing rib and ensuring positive closure of the valve under all pressure conditions.

Moreover by engaging an inner part of the sealing face of the valve disk with an inner part of the resilient valve ring and subsequently engaging an outer part of this face with the valve seat more distant from the center of the port, the inner part of the valve ring is free to be displaced by the valve disk before the radially outer part of the valve disk engages with the firmer part of the valve seat thus further aiding in securing a leak-tight joint between the controlling elements of the valve.

Instead of making the valve ring or disk flat on its opposite sides the same may be constructed as shown in Fig. 5 in which the valve seat ring 32 is provided on its opposite sides adjacent to the periphery thereof with annular front and rear flanges or ribs 33, 34 which can be economically manufactured by molds. When employing a valve seat ring of this construction its front flange 33 is preferably engaged with an annular groove 35 formed on the bottom or shoulder 13 of the valve body which surrounds the port 11 of the same and the rear part of this valve seat ring is supported by a washer having a cylindrical body or wall 36 which engages with the periphery of said valve seat ring and an annular flange 37 projecting inwardly from the rear end of this body or wall 36 and engaging with the rear side of the rear flange 34. In this case the clamping sleeve 18 bears against the rear end of the washer 36, 37 and upon tightening this sleeve the outer marginal part of the valve seat ring 32 is pressed against the shoulder 13 so as to form a leak-tight joint between the same.

By means of the front flange 33 on the valve seat ring engaging with a groove 35 which is concentric with the port 11 and the port hole 16 in the valve seat ring, the latter is maintained in its central position so as to cooperate properly with the valve disk 24, and by providing both sides of this ring with annular flanges 33, 34 either side of this seat ring can be interlocked with the valve body 10 and thus avoid the necessity of selecting the side of the valve ring for engagement with the shoulder 13.

For the purpose of securely holding the clamping sleeve in its tightened position and thus ensure against leakage the rear part of this sleeve and the adjacent part of its web 27 are provided with a transverse slit 38 and those parts of the web on opposite sides of this slit are connected by a clamping screw 39 whereby, upon tightening this screw, the threads of the clamping sleeve will be wedged against the threads of the body and thus serve as a lock for preventing accidental displacement of the clamping sleeve and valve body relative to each other. In this construction the inner sealing rib 29 is higher than the outer sealing rib 30 so that the same engages successively with the resilient valve seat ring 32 in the same manner as that described with reference to the construction shown in Fig. 1.

If desired the effect of first engaging those parts of the valve seat and the valve disk nearest the axis of the same and subsequently engaging those parts of these members farther from their axes may also be attained by making the inner and outer sealing ribs 40, 41 of the valve disk 24 of the same height, and also making the inner part 42 of the seat of the valve ring 124 next to its port 16 relatively high or raised and making the adjacent outer part 43 of this face depressed or lower relative to this high part, as shown in Fig. 6, whereby upon closing the valve disk 24 the high or raised central part 142 of the resilient valve seat ring will be first engaged by the inner sealing rib 40 of the valve disk and squeezed toward its part 16 and thereafter the lower or depressed outer part 43 of this seat ring will be engaged by the outer sealing rib 41 and thus ensure a leak-tight joint between these members.

If desired the valve structure may be made as shown in Fig. 7 in which the body is provided in its fluid passage with a rearwardly facing shoulder 44 which is of rearwardly tapering conical form and the resilient valve ring 45 of corresponding rearwardly tapering form and engaged on its concave side with said shoulder and held in engagement therewith by a clamping washer 46 engaging with the front side of this resilient ring adjacent to the periphery thereof. This washer is pressed toward the valve ring by a clamping sleeve 18 similar to that shown in Figs. 1, 5 and 6. The valve disk 24 in Fig. 7 is provided on its face with inner and outer sealing ribs 40, 41 of small and large diameters arranged concentrically one within the other and adapted to respectively engage with the face of the seat ring adjacent to the port thereof and also at a distance therefrom. This valve seat thus presents a high inner part 47 to the inner sealing rib 40 of the valve disk 18 and a low outer part 48 to the outer sealing rib, which ribs are concentric and of the same height, thereby obtaining a sealing effect similar to that described with reference to Fig. 6.

In each of the several forms of this invention those parts of the valve seat and disk nearest the axes of these members first come into engagement upon closing the valve structure and thereafter those parts of the same farther from the axis of the port come into engagement and thereby secure the advantageous results heretofore described.

I claim as my invention:

1. A valve structure comprising a body having a fluid passage which is provided with a rearwardly facing shoulder and an annular groove formed in said shoulder, a valve seat ring having its front side engaging with said shoulder and provided on its front side with a front flange engaging with said groove and also provided on its rear side with a rear flange, a washer having a cylindrical body surrounding the periphery of said valve seat ring and having a flange engaging the rear flange on said valve seat ring, means for pressing said valve ring and washer toward said shoulder including a clamping sleeve connected with said body, and a valve closure guided in said sleeve and movable toward and from said valve ring.

2. A valve structure comprising a body having a fluid passage provided with an internal shoulder, a valve seat ring having a central port, a supporting face on its front side around said port engaging said shoulder and an annular seat on its rear side around said port, a sleeve having a screw threaded connection with the bore of the body and pressing against the marginal part of said valve seat ring and provided centrally with a longitudinal guideway and having a transverse slit extending from said guideway to the periphery of said sleeve, a valve closure disk movable toward and from said valve seat ring and having a stem slidable in said guideway, and a screw connecting the parts of said sleeve on opposite sides of said slit.

HOWARD A. BENZEL.